United States Patent
Svejkovksy et al.

(10) Patent No.: US 6,216,850 B1
(45) Date of Patent: Apr. 17, 2001

(54) CYCLICALLY POWERED CONVEYOR WITH FLOW LEVELER

(75) Inventors: Paul B. Svejkovksy, Coppell; Kenneth C. Petri, Richardson; Thomas G. Knodell, Jr., Fort Worth; Gilbert C. Winfree, Jr., Lewisville; Paul A. Svejkovksy, Marquez, all of TX (US)

(73) Assignee: Paul A. Svejkovsky, Marquez, TX (US)

( * ) Notice: Subject to any disclaimer, the term of this patent is extended or adjusted under 35 U.S.C. 154(b) by 0 days.

(21) Appl. No.: 09/320,355

(22) Filed: May 26, 1999

(51) Int. Cl.[7] .................................................... B65G 27/00
(52) U.S. Cl. ........................................ 198/771; 198/752.1
(58) Field of Search ................................. 198/752.1, 771

(56) References Cited

U.S. PATENT DOCUMENTS

| | | | |
|---|---|---|---|
| 2,607,471 | * | 8/1952 | Baechli . |
| 2,617,514 | * | 11/1952 | Bebinger ................. 198/14 |
| 2,851,175 | * | 9/1958 | Nilsson et al. . |
| 3,195,713 | * | 7/1965 | Morris et al. . |
| 3,338,385 | * | 8/1967 | Sage . |
| 3,697,056 | * | 10/1972 | Prins, Sr. et al. ............. 432/130 |
| 3,770,097 | * | 11/1973 | Musschoot ............... 198/760 |
| 3,773,058 | * | 11/1973 | Kitterman et al. ............ 134/62 |
| 4,094,123 | * | 6/1978 | Carlson .................. 53/436 |
| 4,141,372 | * | 2/1979 | Gdanski .................. 133/1 |
| 4,449,626 | * | 5/1984 | Dodd ................... 198/765 |
| 4,774,893 | * | 10/1988 | Dumbaugh ................ 110/186 |
| 4,809,839 | * | 3/1989 | Elliott . |
| 4,844,236 | * | 7/1989 | Kraus ................... 198/690.2 |
| 4,869,161 | * | 9/1989 | LaCount .................. 99/455 |
| 5,211,277 | | 5/1993 | Mount . |
| 5,249,859 | * | 10/1993 | Krynock ................. 366/109 |
| 5,277,300 | * | 1/1994 | Maggioni ............... 198/759 |
| 5,351,807 | | 10/1994 | Svejkovsky . |
| 5,555,967 | * | 9/1996 | Hufford ................ 198/359 |
| 5,558,199 | * | 9/1996 | Roether et al. ............ 198/461.2 |
| 5,794,757 | | 8/1998 | Svejkovsky et al. . |
| 5,842,678 | | 12/1998 | Svejkovsky . |
| 6,000,554 | * | 12/1999 | Hughes ................ 209/314 |

FOREIGN PATENT DOCUMENTS

0937667A2 * 8/1999 (EP) .

* cited by examiner

*Primary Examiner*—Christopher P. Ellis
*Assistant Examiner*—Mark A. Deuble
(74) *Attorney, Agent, or Firm*—Browning Bushman

(57) ABSTRACT

A conveyor 10 includes a cyclically powered drive mechanism 24 for moving products along an elongate tray 12 in a forward direction. The tray 12 includes a substantially planar floor 14 for supporting product thereon and tray side 16, 18 on opposing transverse sides of the tray floor. A flow leveler 40, 54, 80, 90 is positioned along the tray floor and normalizes the flow of product moving along the tray. In its preferred embodiment, the flow leveler includes a plurality of elongate ramp members 82, 92 laterally spaced between the tray sides, and optionally arranged in staggered rows. The flow leveler may include a planar leveler floor 48 for positioning within a cutout in the tray floor and a plurality of securing members 42 for movably securing the leveler floor to the tray. The inclined ramp surface of the leveler is preferably angled up to 25° to 45°. The flow leveler is particularly well suited for leveling the flow rate of irregularly shaped snack goods conveyed along the linear motion conveyor.

47 Claims, 3 Drawing Sheets

CYCLICALLY POWERED CONVEYOR WITH FLOW LEVELER

FIELD OF THE INVENTION

The present invention relates to a cyclically powered conveyor of the type which cyclically moves goods along an elongate conveyor tray having a substantially planar tray floor. More particularly, this invention relates to a conveyor which includes a flow leveling device which normalizes irregular product flow rate along the conveyor tray.

BACKGROUND OF THE INVENTION

An increasingly common type of conveyor utilizes a substantially planar tray floor and a drive mechanism cyclically powered to move goods along the tray floor. Because only the conveyor tray contacts the material being conveyed, these types of conveyors are preferred in applications requiring high cleanliness, and are commonly used, for example, in the food processing industry. These conveyors thus have significant advantages over conveyors which utilize moving parts, such as belts or chains, which contact the conveyed products.

One type of conveyor which utilizes a cyclically powered tray is a vibratory conveyor, which employs a substantially planar tray floor with opposing tray sides. The stroke of a vibratory conveyor is relatively short, and typically is approximately $\frac{1}{16}$th of an inch in length, so that the tray imparts an upward and forward motion to products supported on the tray. The tray is thus returned to its original position while the products are out of contact with the tray floor. While vibratory conveyors are widely used in the food processing industry, they have significant disadvantages which have been recognized for decades. The movement of products along the vibratory conveyor tray can be damaging to the products, and thus vibratory conveyors frequently are not desired when moving fragile products. Moreover, when moving products with a seasoning or coating, such as seasoned potato chips, vibratory conveyors are not favored since the vibratory motion tends to shake the seasoning or coating off of the products. In other applications, however, vibratory conveyors are widely accepted for moving products which do not have seasonings or coatings. Also, vibratory conveyor manufacturers have been able to reduce the amount of vibration imparted to the product while still maintaining an acceptable product flow rate along the tray. A exemplary vibratory conveyor is disclosed in U.S. Pat. No. 5,211,277.

Another type of cyclically powered trough-type conveyor is a linear motion conveyor. The stroke of a linear motion conveyor is much longer than for a vibratory conveyor, and typically is in the range of approximately an inch and a half The products move slowly forward with the linear motion of the conveyor tray, and the drive mechanism then returns the tray backward more quickly, thereby sliding the products along the tray. A linear motion conveyor has several significant advantages over vibratory conveyors, primarily because the tray motion is more gentle on the transported products. Linear motion conveyors are thus well suited for transporting fragile goods, such as snack foods. Since the products are not thrust upward off the tray supporting surface, seasoning loosely attached to the products remains on the products. Linear motion conveyors with an improved drive mechanism are disclosed in U.S. Pat. Nos. 5,351,807 and 5,794,757.

One of the drawbacks with early versions of linear motion conveyors was that the drive mechanisms could not rapidly start and stop the conveyor tray movement. These earlier versions of linear motion conveyors were nevertheless commonly used along main conveyor lines. Because of this slow start and slow stop limitation, however, linear motion conveyors were seldom used in cross feeder applications or as conveyors used to feed weighing scales. Newer designs of linear motion conveyors, as disclosed in the above referenced patents, have overcome this limitation, and the drive mechanisms disclosed in currently available linear motion conveyors are able to both start and stop the conveyor tray movement substantially instantaneously. Because of this ability, linear motion conveyors with these improved drive mechanisms are increasingly used in cross-feeder applications and in applications to feed weighing scales.

One of the problems with cyclically powered trough-type conveyors is that product irregularly fed to the conveyor tray tends to remain in that configuration as the linear motion conveyor moves the product along the conveyor tray. Because linear motion conveyors have gentle product handling characteristics, when piles of products are introduced to a linear motion conveyor, the piles thus tend to remain substantially as input to the linear motion conveyor and continue down the length of the tray without leveling out. Piles and voids of product along a linear motion conveyor tray provide irregular product feed rate to the downstream equipment, which then may adversely affect the performance of scales and other equipment which attempts to cope with this substantially irregular product feed rate. The irregular product feed rate from a linear motion conveyor is a significant problem, particularly when the conveyed product, like potato chips, tend to interlock together. Potato chips may thus be irregularly output from a seasoning tumbler to a linear motion conveyor, and irregularly shaped piles of potato chips move along the linear motion conveyor. Due to the shape of the conveyed product and the gentle motion of the linear motion conveyor, these product piles thus continue to travel down the conveyor tray, and are a significant problem to the reliable performance of weighing scales which are adversely affected by the substantially varying product output rate from the linear motion conveyor. Vibratory conveyors have some capability of reducing product piles along the tray due to the vibratory action on the product. As vibration is reduced, however, to accommodate products requiring more gentle handling, irregular product feed rate becomes more of a concern also for vibratory conveyors.

The disadvantages of the prior art are overcome by the present invention, and an improved cyclically powered trough type conveyor with a flow leveler is hereinafter disclosed for normalizing product flow along a linear motion conveyor tray.

SUMMARY OF THE INVENTION

A cyclically powered conveyor for moving product along an elongate conveyor tray includes a cyclically powered drive mechanism. The tray has a substantially planar tray floor for supporting the product thereon and opposing transverse sides, A flow leveler is positioned along the tray such that irregular product flow rate moving along the tray is normalized as the product moves past the flow leveler. The flow leveler includes an upstream end which is substantially level with the tray floor and a downstream portion which is raised substantially above the tray floor. An inclined ramp interconnects the upstream end and the downstream end and acts to create a back pressure which normalizes the flow of product moving along the tray. The drive mechanism may power the tray in a vibratory manner or in a linear motion manner by moving the elongate tray in a forward direction at a slow speed and in a backward direction at a faster speed, thereby sliding products along the tray in a forward direction.

In a preferred embodiment, the flow leveler includes a plurality of elongate ramp members laterally spaced between the tray sides. A lateral thickness of each ramp member is less than the lateral spacing between adjacent ramp members such that product may pass laterally between adjacent ramp members. The ramp members may be arranged in two or more lateral rows with the ramp members being staggered such that a ramp member in a downstream row is laterally spaced between a pair of ramp members in an upstream row. The flow leveler may also include a downstream declined ramp to support product as it moves from the inclined ramp back to the tray floor.

The flow leveler may include a planar leveler floor for positioning within a cutout in the tray floor, with the upstream end of the flow leveler and the downstream portion of the flow leveler then be supported on the leveler floor. A plurality of securing members may be used for removably securing the leveler floor to the tray. This allows the flow leveler to be easily changed out, so that a flow leveler with a desired inclined ramp inclination may be used depending on the characteristics of the product moving along the conveyor and the operation of the conveyor. The inclined ramp is normally angled with respect to the tray floor at from 25 to 45°, and preferably at from 30 to 40°. In one embodiment, the flow leveler is pivotally connected to the tray, and a powered positioning member is used for selectively moving the flow leveler from an active position wherein the flow leveler upstream end is adjacent the tray floor to an inactive position wherein the flow leveler upstream end is raised off the tray floor.

It is an object of the present invention to provide a relatively simple yet highly effective flow leveler for imparting a desired back pressure to product moving along a cyclically powered conveyor with a substantially planar trough floor, thereby restricting the ease at which product may move downstream from the flow leveler and normalizing the flow of product moving along the conveyor.

It is a feature of the invention to provide a flow leveler for use along the tray of a cyclically powered trough type conveyor, with the flow leveler including upstream end substantially level with the tray floor, a downstream portion raised substantially above the tray floor, and a plurality of elongate ramp members each interconnecting the upstream end and the downstream portion and laterally spaced between the tray sides, with the lateral thickness of each ramp member being less than the lateral thickness between adjacent ramp members. This feature effectively eliminates the potential for product at the end of a product run from remaining behind the flow leveler and then becoming stale before a new product pushes the old product over the flow leveler.

It is a feature of the present invention that the flow leveler positioned along an elongate tray of a conveyor may be easily replaced, so that the flow leveler may be easily customized in view of the product being conveyed along the linear motion conveyor and the operating characteristics of the conveyor. In a preferred embodiment, a cutout is thus provided in the tray of the linear motion conveyor, and flow levelers are replaced until the selected flow leveler achieves the desired normalizing purpose for the particular product being conveyed on that conveyor. The change out of the flow leveler also facilitates cleaning of the conveyor.

It is also a feature of this invention to provide a cyclically powered conveyor with a flow leveler, wherein the flow leveler does not create significant cleaning and sanitation problems. In one embodiment, the flow leveler is easily movable from an active position to an inactive position. Also, the flow leveler may include a plurality of elongate ramp members spaced between the tray sides, with the thickness of each ramp member being less than the lateral spacing between adjacent ramp members.

An advantage of the present invention is that the flow leveler is particularly well suited for normalizing the flow of food products being moved along a conveyor tray. Because of their shape, some food products tend to bunch together. Potato chips are often fed onto the conveyor from seasoning tumblers at a irregular flow rate. The present invention may thus normalize the potato chip flow rate before the chips are fed to downstream equipment, such as weighing scales.

Another significant advantage of the present invention is that the flow leveler is relatively simple and thus highly reliable. The flow leveler may be provided on a linear motion conveyor at a nominal cost, and achieves significant advantages by normalizing the flow of product moving along the conveyor.

These and further objects, features, and advantages of the present invention will become apparent from the following detailed description, wherein reference is made to figures in the accompanying drawings.

DETAILED DESCRIPTION OF PREFERRED EMBODIMENTS

Figure 1:
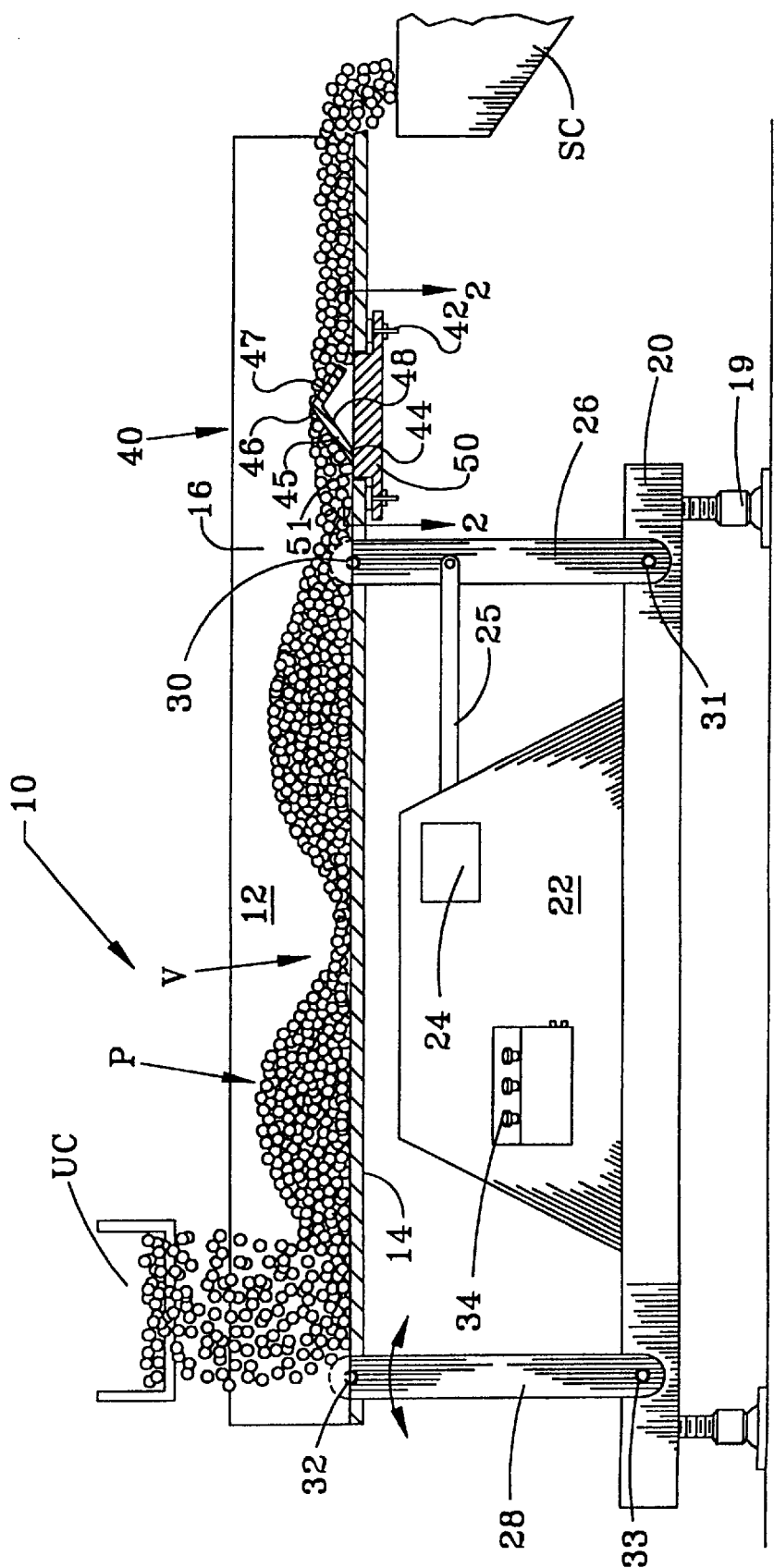
FIG. 1 is a side view, partially in cross-section, of a cyclically powered linear motion conveyor according to the present invention. Goods are fed to the conveyor tray at an irregular flow rate from an upstream conveyor, and are output at a normalized flow rate to scales due to the flow leveler.
Figure 2:
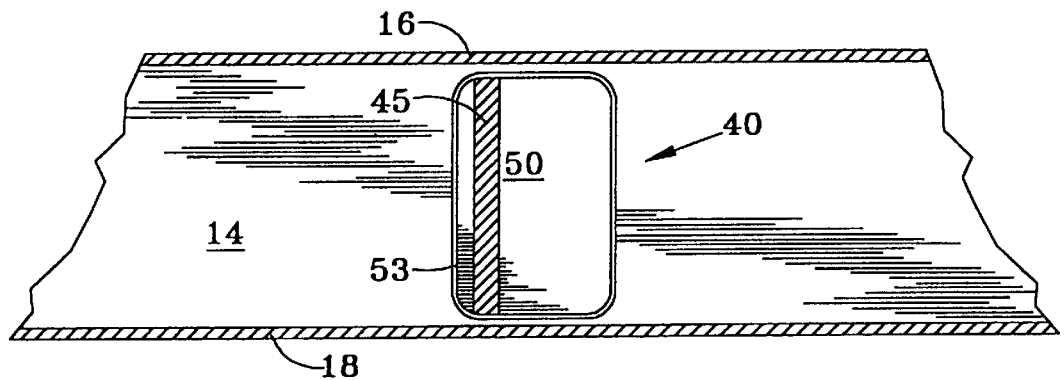
FIG. 2 is a top view of the portion of the conveyor tray shown on FIG. 1 containing the flow leveler.

FIG. 1 discloses one embodiment of a linear motion conveyor 10 according to the present invention. The conveyor includes an elongate tray 12 for moving products longitudinally along the tray. The tray 12 has a substantially planar floor 14 for supporting the transported products thereon, and first and second tray sides 16, 18 as shown in FIG. 2 on opposing sides of the tray floor. The tray side 18 is not shown in FIG. 1 to better illustrate the tray floor and the flow leveler 40. FIG. 1 also shows in simplistic form an upstream conveyor UC for feeding product to the conveyor 10, and a portion of a product weighing scale SC for receiving product from the conveyor 10. Those skilled in the art will appreciate that the upstream conveyor UC represents various types of conveyors and/or other equipment which conventionally supply product to the linear motion conveyor 10. More particularly, it should be understood that the upstream conveyor UC as shown in FIG. 1 may be supplying product at an irregular feed rate to the conveyor 10 such that the product is arranged in piles P having a substantial depth, and in valleys V having a comparatively shallow product depth between two piles. As shown in FIG. 1, flow leveler 40 serves the purpose of normalizing product flow along the tray 12, such that the level of product downstream from the flow leveler 40 is much more uniform than the level of product upstream from the flow leveler, thereby desirably supplying a more uniform flow rate of product to the scales SC.

The depicted conveyor 10 as shown in FIG. 1 includes a conveyor base 20 and a stationary support 22. The base 20 in turn is supported on a plurality of adjustable leg supports 19, so that the floor 14 of the tray may be conveniently positioned at a desired inclination. A suitable machinery mount for supporting the base 12 and for leveling the tray 12 is disclosed in U.S. Pat. No. 5,842,678. Although the floor 14 as shown in FIG. 1 is horizontal, those skilled in the art will appreciate that an advantage of a linear motion conveyor is that the floor may be inclined upward and the drive mechanism may nevertheless still reliably move product along the upwardly inclined conveyor tray.

The conveyor drive mechanism 24 may include an electrically powered motor which cyclically drives a crank arm 25. The conveyor tray 12 may be supported on a plurality of arms 26, 28 each pivotally connected at 31, 33, respectively, to a lower end of the base 20. Each arm 26, 28 is also pivotally connected at 30, 32 to one of the tray sides, so that four arms normally support the tray 12. Those skilled in the art will appreciate the tray 12 may be supported in a variety of manners, and that various types of support members may be used for supporting the tray. The powered drive mechanism 24 moves a tray 12 slowly forward and then more quickly backward in a reciprocating manner, with the product sliding along the tray during the backward movement of the tray. Accordingly, the drive mechanism 24 acts on the conveyor tray to move the goods forward along the tray floor 14, i.e., to the right as shown in FIG. 1. Further details with respect to a suitable drive mechanism for a linear motion conveyor are disclosed in U.S. Pat. No. 5,794,777. A plurality of manually operated controls at control pad 34 may be used for controlling the operation of the drive motor 24.

Referring to FIGS. 1 and 2, the flow leveler 40 includes an upstream end 44 which is substantially level with the tray floor 14 and a downstream portion 46 which is raised substantially above the tray floor. An inclined ramp 45 interconnects the upstream end and the downstream portion and serves to normalize product flow rate moving along the conveyor. FIG. 1 also depicts a downstream ramp 47 spaced opposite the upstream end 44 with respect to the downstream portion 46. The downstream ramp 47 is inclined from the downstream portion toward the tray floor and serves to support product moving from the inclined ramp back to the tray floor. It should be understood that the downstream ramp 47 is optional and may not be required for many applications. Depending on the product being conveyed, the downstream ramp 47 may assist in more gently returning the product to the conveyor tray. As shown in FIG. 1, the unsupported end of the downstream ramp may be raised above the tray floor. In an alternate embodiment, the downstream ramp 47 could continue downward and thus be secured to the tray floor, thereby providing further support for both the inclined ramp 45 and the downstream ramp 47.

Both the inclined ramp 45 and the downstream ramp 47 may be formed from a single piece of material sheet 48 which is welded or otherwise secured at its upstream end to the planar leveler floor 50. The sheet metal sheet 48 thus preferably traverses the width of the conveyor 12 between the conveyor sides, and conventionally would have a thickness of approximately 0.06 inches. The top surface 51 of the planar leveler floor 50 is thus preferably within the same plane as the upper or supporting surface of the tray floor 14. The flow leveler floor is preferably removably secured to the tray 12 by a plurality of conventional securing members, such as threaded studs 42 which are welded to the bottom surface of the tray floor 14. As shown in FIG. 2, a cutout 53 is preferably formed in the tray floor and is sized for receiving the flow leveler plate 50. In FIG. 2, a slight gap is shown between the edges of the cutout and the sides of the flow leveler floor, and it should be understood that this gap is exaggerated in FIG. 2 to illustrate the cutout. Preferably a very close tolerance is maintained between the edges of the cutout in the tray floor and the edges of the flow leveler floor so that there is no void that product may fill. FIG. 2 also depicts that the general configuration of the cutout in the tray floor 14 and thus the general configuration of the flow leveler floor as being rectangular, although preferably the corners are substantially rounded as shown in FIG. 2.

One of the features of the flow leveler according to the present invention is that the flow leveler is easily removable from the tray and thus flow levelers with different ramp dimensions may be easily replaced in a tray so that the desired leveling function is obtained, depending upon the products being conveyed and the operation of the conveyer. The flow leveler thus provides a selected amount of back pressure to the product as it is moving along the conveyor and thus restricts the flow of product since the product must move up the inclined ramp surface 45. Tests conducted on a linear motion conveyor moving potato chips indicate that the desired back pressure can be achieved when the inclined surface 45 is angled at from 25° to 45°, preferably at from 30° to 40°, and ideally at about 35° with respect to the tray floor. For potato chips, the uppermost end of the downstream portion 46 is preferably at least two inches above the tray floor, and is preferably 2 ½ inches above the tray floor. The tray sides 16, 18 typically have the vertical height of approximately six inches.

Although the floor leveler 40 as shown in FIGS. 1 and 2 normalizes product flow and thus "levels out" the peaks P and the valleys V upstream from the flow leveler, this flow leveler design has a disadvantage in that, at the end of a product run when no new product is coming in behind the ramp 40 and causing the desired back pressure, the back pressure will be reduced below the amount required to overcome the inclination of the ramp and thus product will remain upstream of the downstream portion 46 and not move past by the flow leveler. This creates a problem in that the product then may need to be manually moved past the flow leveler 40. Even if the same product is intended to be conveyed on the conveyor 10 the next day, product at the end of one day's run preferably is not left on the conveyor since this product then becomes stale during the period before a new product is introduced to the conveyor and thus creates the required back pressure to push the prior day's product over the flow leveler 40.

Figure 3:
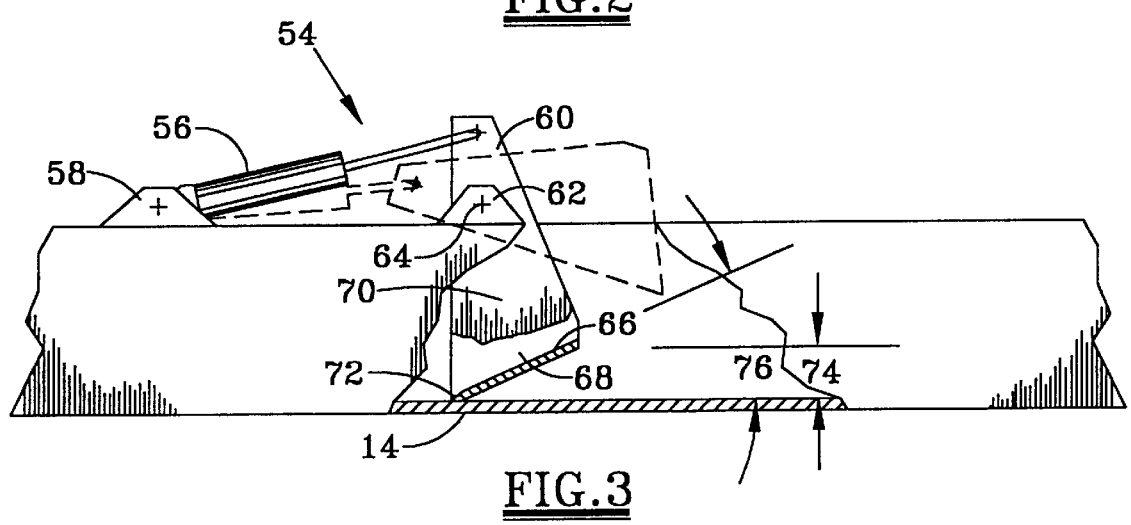
FIG. 3 is a side view of a portion of a conveyor tray with an alternate embodiment of a flow leveler according to the present invention.

One technique for overcoming this problem is to provide a movable flow leveler ramp, as shown in FIG. 3. The flow leveler as shown in FIG. 3 thus comprises a substantially U-shaped body 60 with sides 68, 70 which fit within and are closely adjacent the sides 16, 18 of the conveyor 12, and a ramp 66 which is functionally similar to the ramp 45 discussed above. FIG. 3 thus shows the flow leveler 54 in an active position, with the upstream end of the flow leveler substantially level with the tray floor. In the FIG. 3 embodiment, flow leveler 54 does not include a flow leveler floor, and thus the conveyor floor 14 need not include a cutout. Preferably the upstream edge 72 of the ramp 66 is angled slightly to assist in product being able to move from the supporting surface of the floor 14 to the inclined ramp 66. As with the embodiment previously discussed, the ramp 66 may be inclined in an angle of 25° to 45°, and preferably about 35° to create the required back pressure. The downstream portion of the ramp is thus spaced above the tray floor 14 by a distance 74 of approximately 2 ½ inches.

Each of the sides 68, 70 of the U-shaped body may be pivotably connected to a support bracket 62 as shown in FIG. 3, so that the U-shaped body 60 may rotate about the axis 64. To achieve this rotation, the movable ramp 54 may include a power positioning member 56 which is selectively actuable for moving the flow leveler from the active position wherein the flow leveler upstream end is adjacent to the tray floor (as shown in solid lines in FIG. 3) to the inactive position wherein the flow leveler upstream end is raised off the tray floor (as shown in dashed lines in FIG. 3). In the inactive position, the flow leveler is thus moved completely out of engagement with the product as it passes by the conveyor past the flow leveler. A suitable power positioning member 56 may be an air cylinder which is pivotably connected at one end to a bracket 58 supported on the tray 12, and other end is pivotably connected to the U-shaped ramp body 60.

In order to provide the desired leveling function, the flow leveler 54 is thus normally in the active position as shown in FIG. 3. Toward the end of a product run, however, the cylinder 56 may be activated to move the U-shaped body 60 to the position as shown in dashed lines in FIG. 3, thereby allowing product at a end of the run to easily pass by the flow leveler. Those skilled in the art will appreciate the various types of powered devices may be used for selectively moving the ramp body 50 between the active and inactive positions, and in other embodiments a small electrically powered motor or a hydraulic cylinder may be used for this purpose.

The flow leveler as shown in FIG. 3 thus is able to normally level product as it moves down the conveyor, but may be moved to its inactive position to allow product at the end of the run to pass by the flow leveler. In addition, the flow leveler 54 has two other distinct advantages. First, the flow leveler 54 does not rely upon a cutout in the tray floor and thus minimizes any problems with cleaning of the tray. Second, since the flow leveler does not need a cutout in the tray floor, the flow leveler 54 as shown in FIG. 3 is particularly well suited for adaptation to an existing linear motion conveyor which does not have a flow leveling device.

Figure 4:
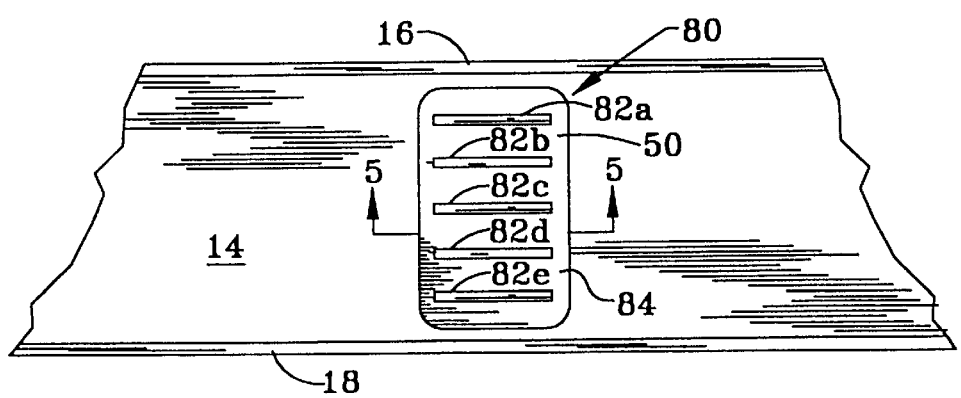
FIG. 4 is a top view of yet another embodiment of a flow leveler which includes a plurality of vertical plates.
Figure 5:
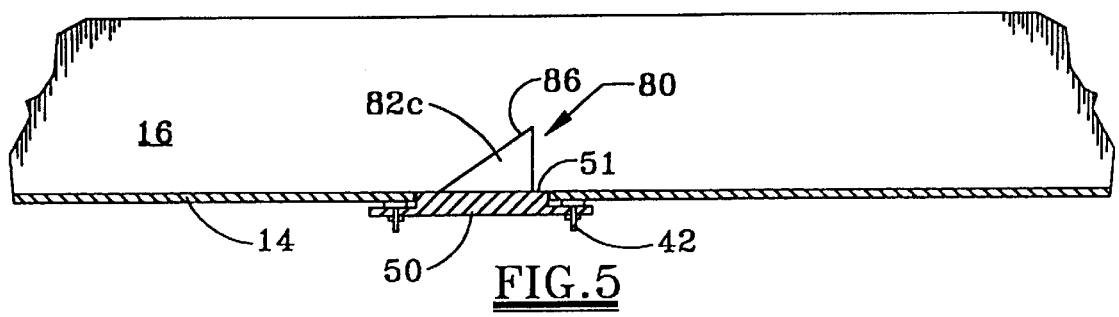
FIG. 5 is a cross-sectional view taken along lines 5—5 in FIG. 4.

FIGS. 4 and 5 depict another embodiment of a flow leveling device 80 according to the present invention. The design as shown in FIGS. 4 and 5 has the advantage of eliminating the problem of product being held upstream of the flow leveler at the end of the product run, but also removes the complexity of a movable flow leveler as shown in FIG. 3. Flow leveler 80 as shown in FIGS. 4 and 5 includes a flow leveler floor 50 which is removably secured to the tray 14 by securing members 42, as discussed for the embodiment shown in FIGS. 1 and 2. The tray 14 thus includes a cutout for receiving the flow leveler floor 50. For this embodiment, however, an inclined sheet metal ramp is replaced with a plurality of substantially vertical plates or strakes which each run parallel to the product flow, i.e., each of the vertical plates is parallel to the longitudinal movement of product along the tray. FIG. 4 depicts five vertical plates which preferably are substantially identical, and are numbered as 82a, 82b, 82c, 82d, and 82e. The plurality of elongate ramp members 82 are thus laterally spaced between the tray sides 16, 18. As shown in FIG. 4, a lateral thickness of each ramp member is substantially less than a lateral spacing between adjacent ramp members, and preferably the lateral spacing of each ramp member in a conveyor tray designed for moving potato chips is less than one-third of the lateral spacing between adjacent ramp members. This feature allows product to freely pass laterally between adjacent ramp members at the end of a product run. The preferred lateral spacing between adjacent ramp members will be dependent on the geometric characteristics of the product being conveyed.

Even though there is thus a substantial lateral gap 84 between adjacent vertical plates, the combination of these laterally spaced vertical plates acts as a substantially continuous ramp so that the products move upward along the inclined ramp surface 86 of each plate (see FIG. 5) in a manner very similar to the solid inclined ramp plate as shown in FIGS. 1 and 2. The plurality of vertical plates thus act on the product flow substantially the same as a solid ramp in that the incoming product to the leveler creates the desired back pressure to levelize product flow. At least some of the transported product, e.g., potato chips, thus pass laterally in the gap 84 between adjacent vertical plates in the same lateral row. At the end of a product run, the gap 84 between adjacent plates allows the product to pass along the flow leveler floor 51 and between the plates 82 so that product does not remain behind the flow leveler.

The plates 82 as shown in FIG. 4 may be relatively thin, and in an exemplary embodiment may only have the thickness of approximately 0.06 inches. The transverse width of a conveyor 12 between the sides 16, 18 is commonly 12 inches, and thus when five laterally spaced plates 82 are provided on the flow leveler 80 as shown in FIG. 4, a spacing of at least an inch and a half exists between adjacent plates and also between the first and last plate and the respective tray side 16, 18. This spacing thus allows potato chips to pass between the plates at the end of a product run. Some of the potato chips may have a width which is greater than the spacing 84 between adjacent plates, but a horizontal potato chip will likely turn so that one edge will drop to the leveler floor 50 while the opposing edge of the chip is raised above the tray floor since the chip may be resting against one of the vertical plates as it passes downstream from the flow leveler 80. The preferred spacing between the vertical plates will depend upon the product being conveyed.

Figure 6:
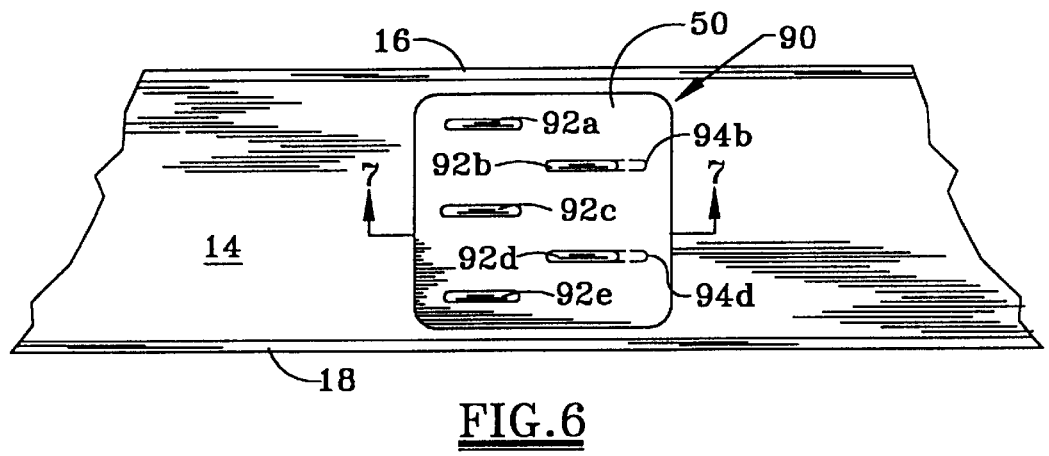
FIG. 6 is a top view of yet another embodiment of a flow leveler according to the present invention which utilizes staggered pins.
Figure 7:
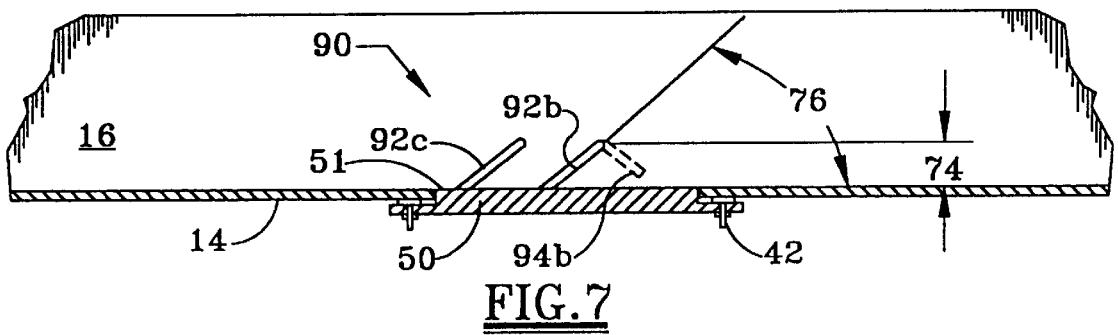
FIG. 7 is a cross-sectional view taken along lines 7—7 in FIG. 6.

FIGS. 6 and 7 disclose yet another embodiment of the flow leveler 90 according to the present invention. The flow leveler 90 as shown in FIGS. 6 and 7 is similar to the flow leveler 80 as shown in FIGS. 4 and 5, but the vertical plates 82 have been replaced with a plurality of pins 92. Moreover, the pins 92 are arranged in upstream and downstream rows, with the pins being staggered so that a pin such as 92b in the downstream row is laterally spaced between and preferably spaced equally between a pair of pins 92a and 92c in an upstream row.

Referring to FIG. 7, each pin 92 has a lower upstream end which is welded or otherwise affixed to the flow leveler floor 50, as previously discussed. Each of the pins may have a rod-like configuration with a diameter of approximately ½ inch. The laterally spaced pins 92 thus cooperate and act together to achieve substantially the same effect as the solid ramp as shown in FIGS. 1 and 2, but again improve the ability to clear a product out at the end of a product run. The downstream pins 92b, 92d are each shown with an optional downstream ramp 94b and 94d, respectively, which is angled as shown in FIG. 7 to return product back to the tray floor in a gentle manner.

By staggering the pins and arranging the pins in a plurality of rows, there is less likelihood that product will become trapped behind the flow leveler at the end of a run. The lateral spacing between pins 92a and 92c may thus be greater than the normal maximum width of a potato chip so that a chip at the end of the run may pass between the pins 92a, 92c or may engage one of the pins 92a and 92c and thus be tilted on its edge to pass by the pins, as previously explained. A chip which passes between the pins 92a and 92c will likely engage the pin 92b, but similarly will be tilted by the inclined surface of the pin 92b and will easily pass downstream from the flow leveler 90. As with the other disclosed embodiments, the ramp of the flow leveler is inclined preferably at an angle 76 as shown in FIGS. 7, with the vertical spacing between the uppermost downstream portion of the flow leveler and the supporting surface of the ramp floor 14 being the spacing 74 discussed above.

The ramp surface of the flow levelers shown in the figures have straight line ramp surfaces. Ramp surfaces which are curved, e.g., parabolic ramp surfaces, may also be used. The ramp members may be formed from any suitable material, such as stainless steel or UHMW polyethylene. Relatively thick UHMW polyethylene plates may be secured on the top of a tray floor by bolts passing through holes drilled in the tray floor, so that this embodiment is well suited to retrofit a tray which previously did not have a flow leveler.

The cyclically powered conveyor may thus be manufactured with a tray which has a cutout therein for receiving one of the flow levelers discussed herein, or alternatively may have supporting brackets and a powered mechanism for moving the flow leveler from an active position to an inactive position, as shown in FIG. 3. Assuming that the cutout is provided in the tray floor, the tray may be provided with appropriate structural reinforcing members which are not discussed to provide the desired structural support for a tray with the flow leveler installed therein. As indicated above, flow levelers may be easily replaced to achieve the optimum flow leveler design for the specific product being conveyed and the specific operation of the conveyor. Those skilled in the art will appreciate that the threaded pins or studs 92 are only one form of removably securing a flow leveler to the pan, and quick release toggle clamps and other forms of commercially available securing members may be used for removably securing the flow leveler to a tray floor.

The flow leveler has been discussed in detail for use on a linear motion conveyor of the type which moves the elongate tray in a forward direction at a slow speed and in a backward direction at a faster speed, thereby sliding goods along the tray in a forward direction. The flow leveler as discussed herein may also be used on a vibratory conveyor to normalize product flow along the conveyor tray. A flow leveler is particularly desirable for a vibratory conveyor which reduces damage to the conveyed product by utilizing a drive mechanism which reduces the vibratory action on the conveyed products.

Various modifications to the cyclically powered conveyor, the floor leveler, and to the methods described herein should be apparent from the above description of the preferred embodiments. Although the invention has thus been described in detail for these embodiments, it should be understood that this explanation is for illustration, and the invention is not limited to the described embodiments. The equipment and operating techniques will thus be apparent to those skilled in the art in view of this disclosure. Further modifications are thus contemplated and may be made without departing from the spirit of the invention, which is defined by the following claims.

What is claimed is:

1. A conveyor for moving product along an elongate tray comprising;
   a cyclically powered drive mechanism for moving the elongate tray and thereby moving product along the tray in a forward direction;
   the elongate tray having a substantially planar tray floor for supporting product thereon and first and second tray sides on opposing transverse sides of the tray floor; and
   a plurality of flow levelers each positioned in lateral rows along the tray, each flow leveler having an upstream end substantially level with the tray floor, a downstream portion raised substantially above the tray floor, and an inclined ramp interconnecting the upstream end and the downstream portion, a lateral spacing between adjacent flow levelers in successive lateral rows being substantially greater than a lateral width of any flow leveler in the respective lateral row, such that irregular product flow rate moving along the tray is normalized as the product moves along the inclined ramp.

2. The conveyor as defined in claim 1, wherein the flow leveler includes a plurality of elongate ramp members laterally spaced between the tray sides, a lateral thickness of each ramp member being less than one-third a lateral spacing between adjacent ramp members, such that product may pass laterally between adjacent ramp members.

3. The conveyor as defined in claim 2, wherein each of the plurality of ramp members includes a substantially vertical plate having a lower plate surface substantially adjacent the tray floor and an upper plate surface defining a portion of the inclined ramp.

4. The conveyor as defined in claim 2, wherein each of the plurality of ramp members is a pin-like member having lower upstream pin end affixed to the tray floor and a downstream pin portion raised substantially off the tray floor.

5. The conveyor as defined in claim 2, wherein the plurality of elongate ramp members are arranged in two or more lateral rows, and a ramp member in a downstream row is laterally spaced between a pair of ramp members in an upstream row.

6. The conveyor as defined in claim 1, wherein the flow leveler further includes a downstream ramp spaced opposite the upstream end with respect to the downstream portion, the downstream ramp being inclined from the downstream portion toward the tray floor to support product moving from the inclined ramp back to the tray floor.

7. The conveyor as defined in claim 1, wherein the flow leveler comprises an inclined sheet panel.

8. The conveyor as defined in claim 1, further comprising:
   the flow leveler being pivotably connected to the tray; and
   a powered positioning member for selectively moving the flow leveler from an active position wherein the flow leveler upstream end is adjacent the tray floor to an inactive position wherein the flow leveler upstream end is raised off the tray floor.

9. The conveyor as defined in claim 1, wherein the inclined ramp surface is angled with respect to the tray floor at from 25° to 45°.

10. The conveyor as defined in claim 1, wherein the downstream portion of the flow leveler is spaced at least 2 inches above the tray floor.

11. The conveyor as defined in claim 1, further comprising:
a plurality of supports for supporting the conveyor tray, each of the plurality of supports being pivotally connected to a conveyor base.

12. The conveyor as defined in claim 1, further comprising:
the flow leveler being pivotably connected to the tray; and
a powered positioning member for selectively moving the flow leveler from an active position wherein the flow leveler upstream end is adjacent the tray floor to an inactive position wherein the flow leveler upstream end is raised off the tray floor.

13. The conveyor as defined in claim 1, wherein the plurality of ramp members are each substantially elongate pin members.

14. The conveyor as defined in claim 1, wherein the lateral spacing between adjacent flow levelers in respective lateral rows is at least three times a lateral width of any flow leveler in the respective lateral row.

15. The conveyor as defined in claim 1, wherein the downstream portion of each of the plurality of flow levelers is spaced at least 2 inches above the planar floor.

16. A conveyor for moving product along an elongate tray, comprising;
a cyclically powered drive mechanism for moving the elongate tray and thereby moving product along the tray in a forward direction;
the elongate tray having a substantially planar tray floor for supporting product thereon and first and second tray sides on opposing transverse sides of the tray floor; and
a flow leveler positioned along the tray, the floor leveler having an upstream end substantially level with the tray floor, a downstream portion raised substantially above the tray floor, and a plurality of ramp members interconnecting the upstream end and the downstream portion and inclined at from 25° to 45° with respect to the tray floor, each of the plurality of ramp members being laterally spaced between the tray sides, a lateral thickness of each ramp member being less than a lateral spacing between adjacent ramp members, such that product may pass laterally between adjacent ramp members and irregular product flow rate moving along the tray is normalized as the product moves along the ramp members.

17. The conveyor as defined in claim 16, wherein each of the plurality of ramp members includes a substantially vertical plate having a lower plate surface substantially adjacent the tray floor and an upper plate surface defining an inclined ramp.

18. The conveyor as defined in claim 17, wherein each of the plurality of ramp members is a pin-like member having lower upstream pin end affixed to the tray floor and a downstream pin portion raised substantially off the tray floor.

19. The conveyor as defined in claim 17, wherein the plurality of elongate ramp members are arranged in two or more lateral rows, and a ramp member in a downstream row is laterally spaced between a pair of ramp members in an upstream row.

20. The conveyor as defined in claim 17, wherein the flow leveler further includes a downstream ramp spaced opposite the upstream end with respect to the downstream portion, the downstream ramp being inclined from the downstream portion toward the tray floor to support product moving from the inclined ramp back to the tray floor.

21. The conveyor as defined in claim 16, wherein the plurality of ramp members are each substantially elongate pin members.

22. The conveyor as defined in claim 16, wherein the lateral spacing between adjacent ramp members in respective lateral rows is at least three times a lateral width of any flow leveler in the respect lateral row.

23. The conveyor as defined in claim 13, wherein the downstream portion of each of the plurality of ramp members is spaced at least 2 inches above the planar floor.

24. A flow leveler for use along a tray of a conveyor to normalize flow of product moving along the tray, the flow leveler comprising;
an upstream end substantially level with the tray floor, a downstream portion raised substantially above the tray floor, and a plurality of elongate ramp members each interconnecting the upstream end and the downstream portion and laterally spaced In successive rows between the tray sides, a lateral thickness of each ramp member being substantially less than a lateral spacing between adjacent ramp members in successive lateral rows, such that product may pass laterally between adjacent ramp members and irregular product flow rate moving along the tray is normalized as the product moves along the ramp members.

25. The flow leveler as defined in claim 24, wherein each of the plurality of ramp members includes a substantially vertical plate having a lower plate surface substantially adjacent the tray floor and an upper plate surface defining an inclined ramp.

26. The flow leveler as defined in claim 25, wherein each of the plurality of inclined ramp members is angled with respect to the tray floor at from 25° to 45°.

27. The flow leveler as defined in claim 24, wherein each of the plurality of ramp members is a pin-like member having lower upstream pin end affixed to the tray floor and a downstream pin portion raised substantially off the tray floor.

28. The flow leveler as defined in claim 24, wherein the plurality of elongate ramp members are arranged in two or more lateral rows, and a ramp member in a downstream row is laterally spaced between a pair of ramp members in an upstream row.

29. The flow leveler as defined in claim 24, further comprising:
at least one of the plurality of ramp members including a downstream ramp spaced opposite the respective upstream end with respect to the respective downstream portion, the downstream ramp being inclined from the downstream portion toward the tray floor to support product moving from the respective inclined ramp back to the tray floor.

30. The flow leveler as defined in claim 24, further comprising:
the flow leveler being pivotably connected to the tray; and
a powered positioning member for selectively moving the flow leveler from an active position wherein the flow leveler upstream end is adjacent the tray floor to an inactive position wherein the flow leveler upstream end is raised off the tray floor.

31. The flow levelers as defined in 24, wherein the plurality of ramp members are each substantially elongate pin members.

32. The conveyor as defined in claim 24, wherein the lateral spacing between adjacent flow levelers in respective lateral rows is at least three times a lateral width of any flow leveler in the respect lateral row.

33. The conveyor as defined in claim 24, wherein the downstream portion of each of the plurality of ramp members is spaced at least 2 inches above the planar floor.

34. A conveyor for moving product along an elongate tray, comprising;

a cyclically powered drive mechanism for moving the elongate tray and thereby moving product along the tray in a forward direction;

the elongate tray having a substantially planar tray floor for supporting product thereon and first and second tray sides on opposing transverse sides of the tray floor; and a flow leveler positioned along the tray, the flow leveler having an upstream end substantially level with the tray floor, a downstream portion raised substantially above the tray floor, and an inclined ramp interconnecting the upstream end and the downstream portion, such that irregular product flow rate moving along the tray is normalized as the product moves along the inclined ramp;

the flow leveler including a planar leveler floor for positioning the floor within a cutout in the tray floor;

the upstream end of the flow leveler and the downstream portion of the flow leveler being supported on the leveler floor; and a plurality of securing the members for removably securing the leveler floor to the tray.

35. The conveyor as defined in claim 34, further comprising:

the elongate ramp members interconnecting the upstream end and the downstream portion being inclined at from 25° to 45° with respect to the tray floor.

36. The conveyor as defined in claim 34, further comprising:

each of the the elongate ramp member including a substantially vertical plate having a lower plate surface substantially adjacent the tray floor and an upper plate surface defining an inclined ramp.

37. The conveyor as defined in claim 34, wherein the plurality of ramp members are each substantially elongate pin members.

38. The conveyor as defined in claim 34, wherein the lateral spacing between adjacent ramp members in respective lateral rows is at least three times a lateral width of any flow leveler in the respect lateral row.

39. The conveyor as defined in claim 34, wherein the downstream portion of each of the plurality of ramp members is spaced at least 2 inches above the planar floor.

40. A flow leveler for use along a tray of a conveyor to normalize flow of product moving along the tray, the flow leveler comprising;

an upstream end substantially level with the tray floor, a downstream portion raised substantially above the tray floor, and a plurality of elongate ramp members each interconnecting the upstream end and the downstream portion and laterally spaced between the tray sides, a lateral thickness of each ramp member being less than a lateral spacing between adjacent ramp members, such that product may pass laterally between adjacent ramp members and irregular product flow rate moving along the tray is normalized as the product moves along the ramp members;

the flow leveler including a planar leveler floor for positioning the floor within a cutout in the tray floor;

the upstream end of the flow leveler and the downstream portion of the flow leveler being supported on the leveler floor; and a plurality of securing members for removably securing the leveler floor to the tray.

41. The flow leveler as defined in claim 40, wherein the plurality of ramp members are each substantially elongate pin members.

42. The conveyor as defined in claim 40, wherein the lateral spacing between adjacent ramp members in respective lateral rows is at least three times a lateral width of any flow leveler in the respect lateral row.

43. The conveyor as defined in claim 40, wherein the downstream portion of each of the plurality of ramp members is spaced at least 2 inches above the planar floor.

44. A conveyor for moving product along an elongate tray, comprising;

a cyclically powered drive mechanism for moving the elongate tray and thereby moving product along the tray in a forward direction;

the elongate tray having a substantially planar tray floor for supporting product thereon and first and second tray sides on opposing transverse sides of the tray floor;

a flow leveler positioned along the tray, the floor leveler having an upstream end substantially level with the tray floor, a downstream portion raised substantially above the tray floor, and a plurality of elongated ramp members each interconnecting the upstream end and the downstream portion and inclined at from 25° to 45° with respect to the tray floor and laterally spaced between the tray sides, a lateral thickness of each ramp member being less than a lateral spacing between adjacent ramp members, such that product may pass laterally between adjacent ramp members and irregular product flow rate moving along the tray is normalized as the product moves along the ramp members;

each of the plurality of ramp members includes a substantially vertical plate having a lower plate surface substantially adjacent the tray floor and an upper plate surface defining an inclined ramp;

the flow leveler including a planar leveler floor for positioning within a cutout in the tray floor;

the upstream end of the flow leveler and the downstream portion of the flow leveler being supported on the leveler floor; and a plurality of securing members for removably securing the leveler floor to the tray.

45. The flow leveler as defined in claim 44, wherein the plurality of ramp members are each substantially elongate pin members.

46. The conveyor as defined in claim 44, wherein the lateral spacing between adjacent ramp members in respective lateral rows is at least three times a lateral width of any flow leveler in the respect lateral row.

47. The conveyor as defined in claim 44, wherein the downstream portion of each of the plurality of ramp members is spaced at least 2 inches above the planar floor.

* * * * *